US012613525B2

(12) United States Patent
Xing

(10) Patent No.: US 12,613,525 B2
(45) Date of Patent: Apr. 28, 2026

(54) INTELLIGENT COOPERATIVE CONTROL METHOD AND SYSTEM FOR CONNECTED VEHICLE FLEET, ELECTRONIC DEVICE AND STORAGE MEDIUM

(71) Applicant: BLACK SESAME TECHNOLOGIES (CHONGQING) CO., LTD., Chongqing (CN)

(72) Inventor: Jianhua Xing, Shanghai (CN)

(73) Assignee: BLACK SESAME TECHNOLOGIES (CHONGQING) CO., LTD., Chongqing (CN)

( * ) Notice: Subject to any disclaimer, the term of this patent is extended or adjusted under 35 U.S.C. 154(b) by 262 days.

(21) Appl. No.: 18/233,298

(22) Filed: Aug. 12, 2023

(65) Prior Publication Data

US 2024/0053767 A1 Feb. 15, 2024

(30) Foreign Application Priority Data

Aug. 12, 2022 (CN) .......................... 202210969380.4

(51) Int. Cl.
*G05D 1/00* (2024.01)
*B60W 30/16* (2020.01)
(Continued)

(52) U.S. Cl.
CPC ........... *G05D 1/0291* (2013.01); *B60W 30/16* (2013.01); *B60W 40/02* (2013.01);
(Continued)

(58) Field of Classification Search
CPC .... G05D 1/0291; B60W 30/16; B60W 40/02; B60W 60/0015; B60W 2554/80;
(Continued)

(56) References Cited

U.S. PATENT DOCUMENTS

2021/0109535 A1* 4/2021 Tansey ................. G05D 1/0011

FOREIGN PATENT DOCUMENTS

CN       111081009 A       4/2020
CN       112256020 A       1/2021
(Continued)

*Primary Examiner* — Aniss Chad
*Assistant Examiner* — Nikki Marie M Molina
(74) *Attorney, Agent, or Firm* — Shun Yao; Yao Legal Services, Inc.

(57) ABSTRACT

Disclosed are an intelligent cooperative control method and system for a coupled vehicle fleet, an electronic device and a storage medium. The method includes: acquiring environment perception information and/or vehicle status information; calculating a vehicle safety control instruction based on the environment perception information and/or the vehicle status information; acquiring a vehicle fleet cooperative control instruction sent by a vehicle; calculating a vehicle motion control instruction based on the vehicle fleet cooperative control instruction and/or the vehicle status information; and controlling the vehicle in response to the vehicle safety control instruction and the vehicle motion control instruction. An intelligent cooperative control method and system for a coupled vehicle fleet, an electronic device and a storage medium provided in the present disclosure may effectively improve the stability of vehicle fleet and the safety of the system.

14 Claims, 5 Drawing Sheets

(51) Int. Cl.
    *B60W 40/02*         (2006.01)
    *B60W 60/00*         (2020.01)

(52) U.S. Cl.
    CPC ..... *B60W 60/0015* (2020.02); *B60W 2554/80*
            (2020.02); *B60W 2556/65* (2020.02)

(58) Field of Classification Search
    CPC ..... B60W 2556/65; G08G 1/22; G08G 1/164;
            G08G 1/0967; G08G 1/166
    See application file for complete search history.

(56)                 References Cited

FOREIGN PATENT DOCUMENTS

| CN | 112660126 A | | 4/2021 | |
|----|-------------|---|--------|---|
| CN | 112820097 A | | 5/2021 | |
| CN | 113012448 A | | 6/2021 | |
| CN | 113066282 A | | 7/2021 | |
| CN | 113848867 A | * | 12/2021 | ........... G05D 1/0077 |
| CN | 114137948 A | | 3/2022 | |
| CN | 114715152 A | | 7/2022 | |
| CN | 114783170 A | | 7/2022 | |
| CN | 114822083 A | * | 7/2022 | ............... G08G 1/04 |

* cited by examiner

INTELLIGENT COOPERATIVE CONTROL METHOD AND SYSTEM FOR CONNECTED VEHICLE FLEET, ELECTRONIC DEVICE AND STORAGE MEDIUM

RELATED APPLICATION

This application hereby claims priority under 35 U.S.C. § 119 to the following foreign patent application: China Patent Application No. 202210969380.4 filed Aug. 12, 2022.

TECHNICAL FIELD

The embodiments of the present application relate to the field of intelligent connected vehicle technologies, and in particular, to an intelligent cooperative control method and system for connected vehicle fleet, an electronic device and a storage medium.

BACKGROUND

Vehicle fleet cooperative control is to implement cooperative movement control through vehicle-to-vehicle communication between vehicles arranged in a queue, which has obvious advantages such as reducing vehicle energy consumption, lowering a total carbon emission of a vehicle fleet, reducing road traffic congestion, increasing road utilization, and improving driving comfort. With the development of automotive electronic and electrical technology, sensor technology and communication technology, the vehicle fleet cooperative control is applied more and more widely.

Currently, the vehicle fleet cooperative control is mainly based on direct communication between vehicles to transmit corresponding instructions. Due to inherent problems such as time delay, data packet loss, and out-of-order transmission in a communication network, accumulated continuous vehicle following errors are easily caused, leading to frequent acceleration and deceleration of vehicles, instability in a vehicle queue, and in severe cases, resulting in dissolution of a vehicle fleet, and even traffic accidents such as a vehicle collision between a front vehicle and a rear vehicle. In addition, in a moving process of a vehicle fleet, since there is another road traffic participant, for example, another vehicle mistakenly enters a current lane, traffic accidents such as scratching and collision between the vehicle fleet and the another road traffic participant are often easily caused.

SUMMARY

A plurality of embodiments of present specification provides an intelligent cooperative control method and system for a connected vehicle fleet, an electronic device and a storage medium, which can improve the driven safety and stability of vehicle fleet.

Based on the above object, an embodiment of the present specification provides an intelligent cooperative control method for a connected vehicle fleet, including: acquiring environment perception information and/or vehicle status information; calculating a vehicle safety control instruction based on the environment perception information and/or the vehicle status information; acquiring a vehicle fleet cooperative control instruction sent by a vehicle; calculating a vehicle motion control instruction based on the vehicle fleet cooperative control instruction and/or the vehicle status information; and controlling the vehicle in response to the vehicle safety control instruction and the vehicle motion control instruction.

An embodiment of the present specification provides an intelligent cooperative control system for a connected vehicle fleet, including: an environment perception module, configured to detect another road traffic participant, lane sideline information, and information about an obstacle in a queue within a preset range of a vehicle fleet queue, and to acquire a longitudinal distance between a current vehicle and a preceding vehicle, a distance between a current vehicle and a lane sideline, and information about another road traffic participant in the vehicle fleet queue; a vehicle status monitoring module, configured to monitor a real-time vehicle status, and to acquire a real-time vehicle speed, a real-time vehicle acceleration, and steering wheel angle information; a cooperative control module, configured to: perform vehicle motion control according to a lead vehicle instruction, receive a vehicle fleet cooperative control instruction transmitted by a vehicle-to-vehicle communications module through a connection with the vehicle-to-vehicle communications module and an in-vehicle communications module separately, receive vehicle status information transmitted by the in-vehicle communications module, calculate a corresponding vehicle motion control instruction, and transmit the vehicle motion control instruction to a safety module through the in-vehicle communications module; a safety module, configured to: take over vehicle motion control when the vehicle fleet cooperative control instruction potentially causes danger, receive environment perception information and vehicle status information through a connection with the environment perception module, the vehicle status monitoring module, and the cooperative control module by using the in-vehicle communications module, and obtain a vehicle safety control instruction through calculation; compare the vehicle safety control instruction with the vehicle motion control instruction obtained from the cooperative control module; and transmit a takeover instruction to the cooperative control module and transmit the vehicle safety control instruction to a corresponding execution module through the in-vehicle communication module when the vehicle motion control instruction of the cooperative control module potentially poses a danger to a vehicle or road traffic safety; if the vehicle motion control instruction is consistent with the vehicle safety control instruction or a difference between the vehicle motion control instruction and the vehicle safety control instruction is within an allowable range, forward the vehicle motion control instruction to a corresponding execution module through the in-vehicle communications module; an execution module, configured to: execute a received control instruction, and control a vehicle speed and a steering angle according to a corresponding instruction; an in-vehicle communications module, configured to perform information communication between modules in a vehicle; and a vehicle-to-vehicle communications module, configured to perform information communication between vehicles.

An embodiment of the present specification provides an electronic device, including a memory, a processor, and a computer program stored on the memory and executable on the processor, where the processor implements above method when executing the computer program.

An embodiment of the present specification provides a non-transitory computer-readable storage medium, where the non-transitory computer-readable storage medium stores computer instructions configured to make a computer perform above method.

According to a plurality of embodiments provided in the present specification, environment perception information and current vehicle status information is fused, safety verification is performed on cooperative control instruction, and if executing the cooperative control instruction poses a danger to a vehicle or road traffic safety, a corresponding vehicle safety control instruction is executed to take over vehicle motion control, so that the occurrence of traffic accidents is avoided, and the stability of vehicle fleet and the safety of the system are improved.

BRIEF DESCRIPTION OF THE DRAWINGS

In order to illustrate the technical solutions of the exemplary embodiments of the present specification more clearly, the following briefly introduces the accompanying drawings used in describing the embodiments. Obviously, the introduced accompanying drawings are only a part of the accompanying drawings to be described in this application, rather than all accompanying drawings. For those of ordinary skill in the art, other accompanying drawings may be obtained based on these accompanying drawings without paying creative work.

DETAILED DESCRIPTIONS OF THE EMBODIMENTS

Figure 1:
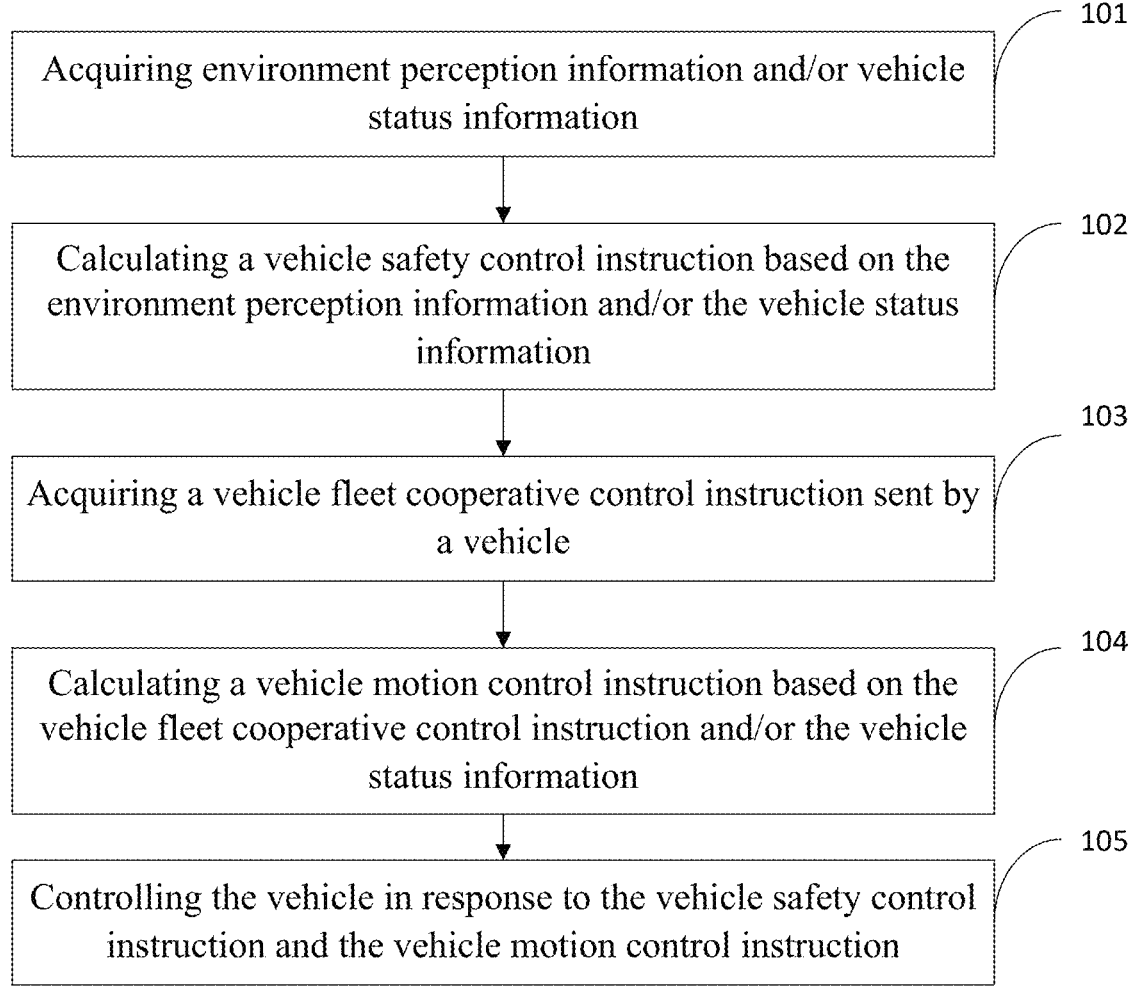
FIG. 1 is a schematic diagram of an intelligent cooperative control method for a connected vehicle fleet according to an embodiment of the present specification.

The following clearly and completely describes the technical solutions in the embodiments of the present specification with reference to the accompanying drawings in the embodiments of the present invention. Apparently, the described embodiments are a part rather than all of the embodiments of the present specification. All other embodiments obtained by a person of ordinary skill in the art based on the embodiments of the present specification without creative efforts shall fall within the protection scope of the present invention.

It should be noted that, unless otherwise defined, the technical terms or scientific terms used in embodiments of present disclosure should be the common meanings understood by one of ordinary skill in the art to which the present disclosure belongs. The terms "the first", "the second" and similar words used in embodiments of present disclosure do not denote any order, quantity, or importance, but are merely used to distinguish different components. Words such as "comprising" or "including" are intended to indicate that elements or objects in front of the word encompass the elements or objects listed after the word and their equivalents, without excluding other elements or objects. Words such as "connected" or "connection" are not limited to physical or mechanical connections, but may include electrical connections, whether direct or indirect. The terms "upper", "lower", "left", "right" and the like are only used to represent a relative positional relationship, and when the absolute position of the described object is changed, the relative positional relationship may also be correspondingly changed.

The functional safety is crucial to safety-related electronic and electrical system in the field of automobiles. At present, design of automobile functional safety generally follows a road vehicle functional safety standard ISO26262 issued by the International Standardized Organization (ISO), and a latest version is published in 2018, which is derived from a functional safety basic standard of electronic and programmable devices IEC61508 published by the International Electrotechnical Association (IEC), and mainly targets specific electronic equipment, electrical devices, programmable electronic devices and the like in the automobile industry. ISO26262 is modified in China to formulate a corresponding National Recommendation Standard "Road Vehicles Functional Safety" (GB/T34590-2017), the entire content of which is incorporated in a new steering system mandatory national standard "Vehicle Steering System Basic Requirements" (GB17675-2021), and a functional safety item is added, meaning that a steering system must meet the requirements of corresponding functional safety aspects to obtain type approval for a vehicle type which is on sale after a specified implementation date. This also indicates that the functional safety is gradually transformed from the "voluntary standard" to the "regulatory mandatory requirement". However, currently, the vehicle fleet cooperative control is mainly based on direct communication between vehicles to transmit a corresponding instruction, accumulated continuous vehicle following errors are easily caused, leading to frequent acceleration and deceleration of vehicles, instability in a vehicle fleet queue, and in severe cases, resulting in dissolution of a vehicle fleet, and even traffic accidents such as a vehicle collision between a front vehicle and a rear vehicle. In addition, in a moving process of a vehicle fleet, since there is another road traffic participant, for example, another vehicle mistakenly enters a current lane, traffic accidents such as scratching and collision between the vehicle fleet and the another road traffic participant are often easily caused.

Figure 2:
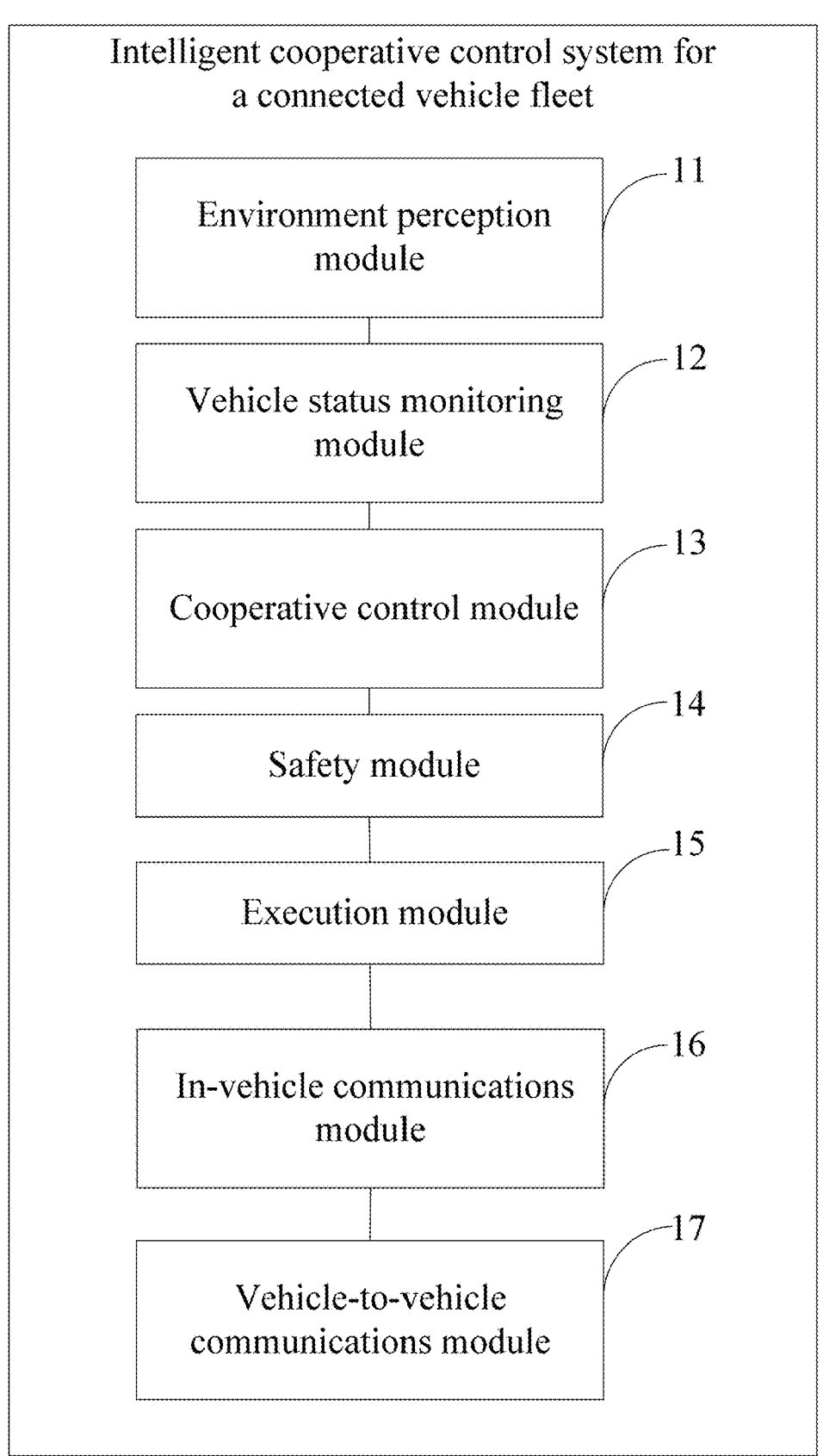
FIG. 2 is a schematic diagram of an intelligent cooperative control system for a connected vehicle fleet according to an embodiment of the present specification.

The present disclosure provides an embodiment of an intelligent cooperative control system for a connected vehicle fleet, as shown in FIG. 2, the system includes a number of modules.

An environment perception module 11 is configured to; detect another road traffic participant, lane sideline information, and information about an obstacle in a queue within a preset range of a vehicle fleet queue; and acquire a longitudinal distance between a current vehicle and a preceding vehicle, a distance between a current vehicle and a lane sideline, and information about another road traffic participant in the vehicle fleet queue.

A vehicle status monitoring module 12 is configured to monitor a real-time vehicle status, and acquire a real-time vehicle speed, a real-time vehicle acceleration, and steering wheel angle information.

A cooperative control module 13 is configured to: perform vehicle motion control according to a lead vehicle instruction, receive a vehicle fleet cooperative control instruction transmitted by a vehicle-to-vehicle communications module 17 through a connection with the vehicle-to-vehicle communications module 17 and an in-vehicle communications module 16 separately, receive vehicle status information transmitted by the in-vehicle communications module 16, calculate a corresponding vehicle motion control instruction, and transmit the vehicle motion control instruction to a safety module 14 through the in-vehicle communications module.

The safety module 14 is configured to: take over vehicle motion control when the vehicle fleet cooperative control instruction potentially causes danger, receive environment perception information and vehicle status information through a connection with the environment perception module 11, the vehicle status monitoring module 12, and the cooperative control module 13 by using the in-vehicle communications module 16, and obtain a vehicle safety control instruction through calculation; compare the vehicle safety control instruction with the vehicle motion control instruction obtained from the cooperative control module 13; and transmit a takeover instruction to the cooperative control module 13 and transmit the vehicle safety control instruction to a corresponding execution module 15 through the in-vehicle communications module 16 when the vehicle motion control instruction of the cooperative control module 13 potentially poses a danger to a vehicle or road traffic safety; if the vehicle motion control instruction is consistent with the vehicle safety control instruction or a difference between the vehicle motion control instruction and the vehicle safety control instruction is within an allowable range, forward the vehicle motion control instruction to a corresponding execution module 15 through the in-vehicle communications module 16.

An execution module 15 is configured to: execute a received control instruction, and control a vehicle speed and a steering angle according to a corresponding instruction.

An in-vehicle communications module 16 is configured to perform information communication between modules in a vehicle.

The vehicle-to-vehicle communications module 17 is configured to perform information communication between vehicles.

Figure 3:
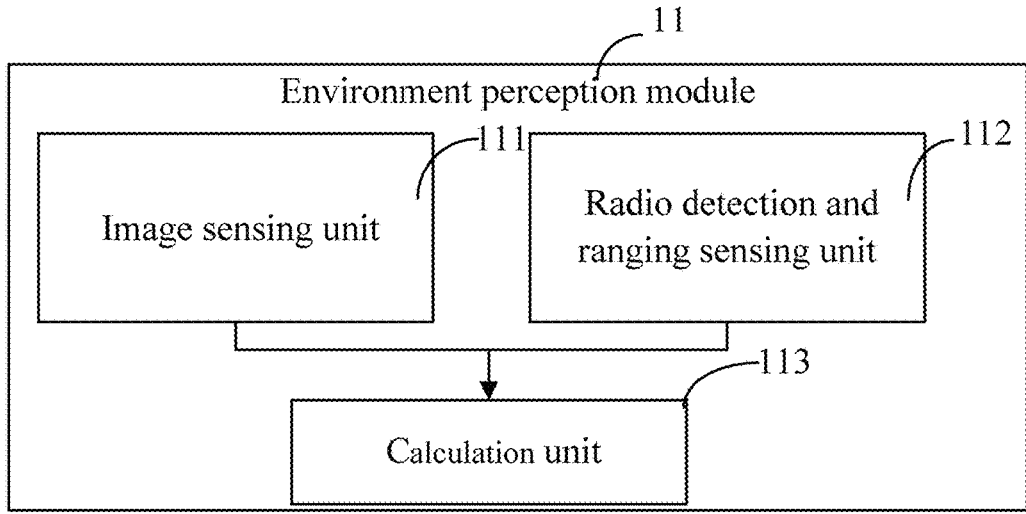
FIG. 3 is a schematic structural diagram of an environment perception module according to an embodiment of the present specification.

In a feasible embodiment, as shown in FIG. 3, an environment perception module 11 includes an image sensing unit 111, a radio detection and ranging sensing unit 112, and a calculation unit 113.

Figure 4:
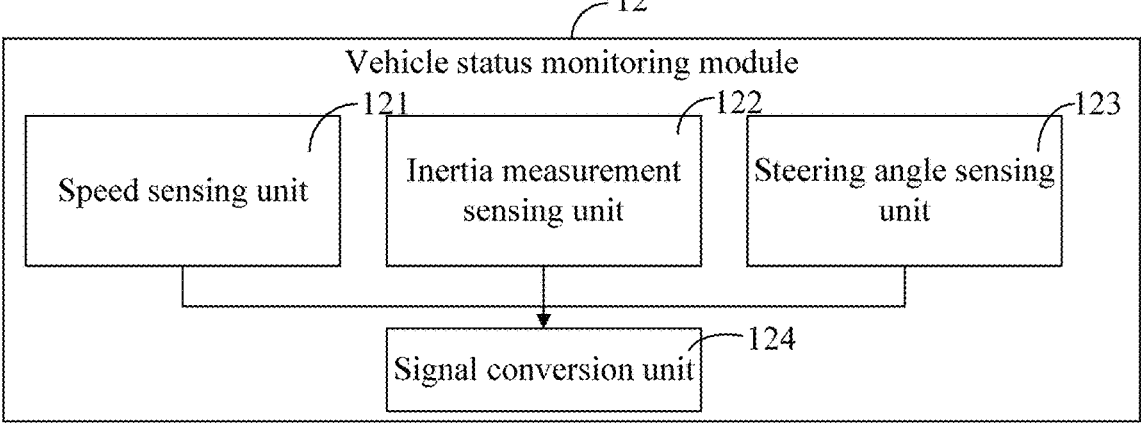
FIG. 4 is a schematic structural diagram of a vehicle status monitoring module according to an embodiment of the present specification.

In a feasible embodiment, as shown in FIG. 4, a vehicle status monitoring module 12 includes a speed sensing unit 121, an inertia measurement sensing unit 122, a steering angle sensing unit 123, and a signal conversion unit 124.

Figure 5:
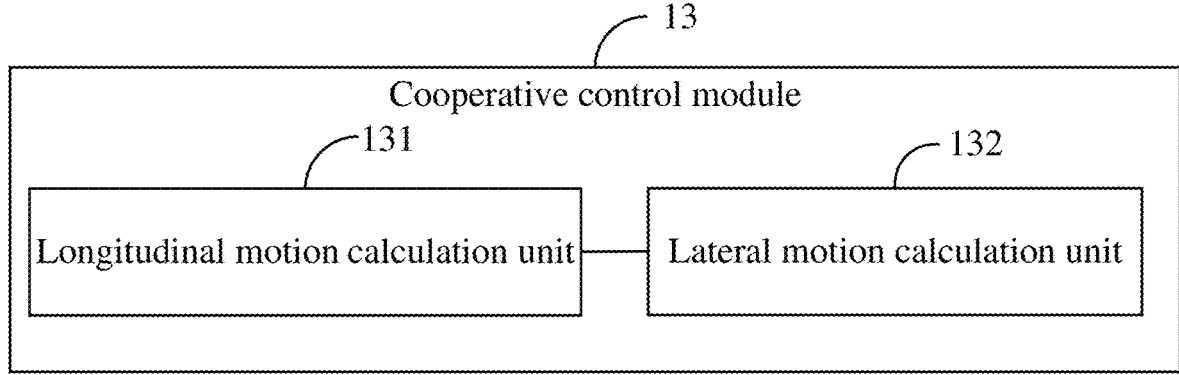
FIG. 5 is a schematic structural diagram of a cooperative control module according to an embodiment of the present specification.

In a feasible embodiment, as shown in FIG. 5, a cooperative control module 13 includes a longitudinal motion calculation unit 131 and a lateral motion calculation unit 132.

Figure 6:
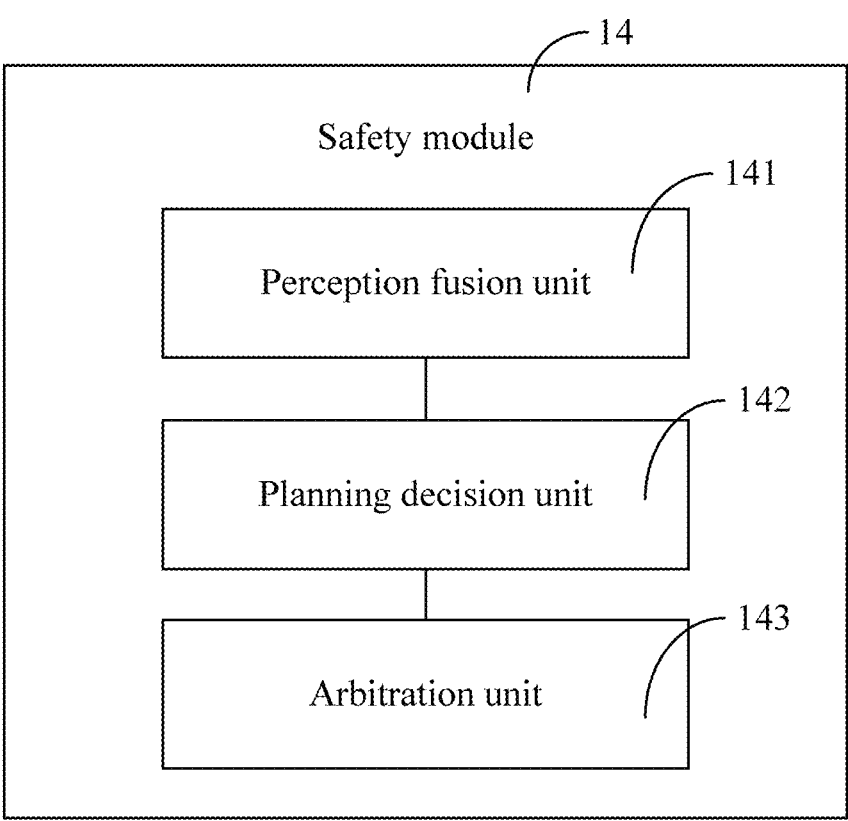
FIG. 6 is a schematic structural diagram of a safety module according to an embodiment of the present specification.

In a feasible embodiment, as shown in FIG. 6, a safety module 14 includes a perception fusion unit 141, a planning decision unit 142, and an arbitration unit 143.

Figure 7:
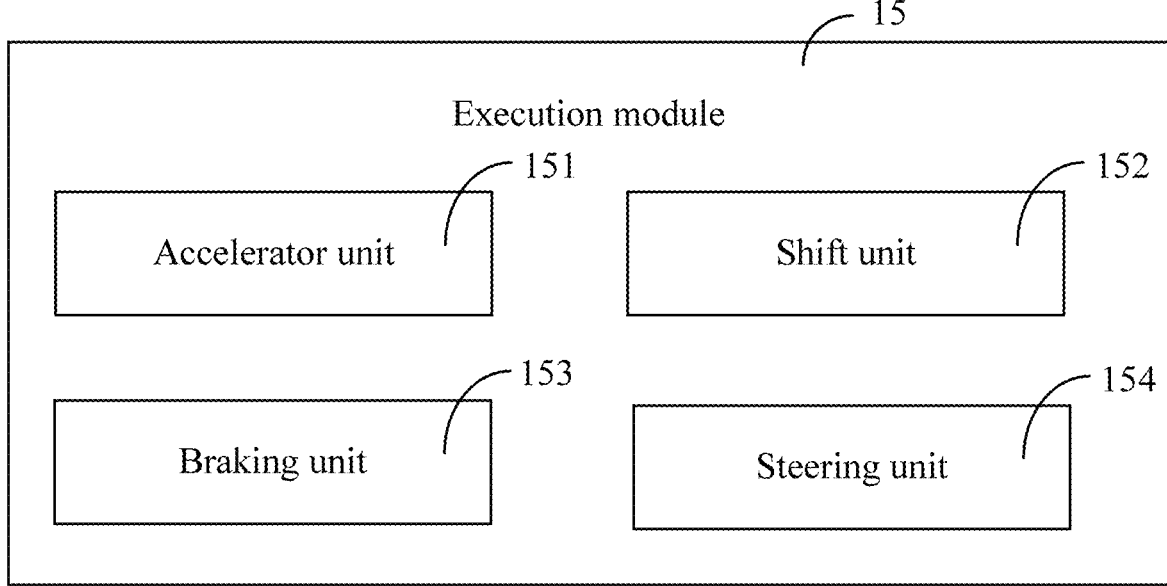
FIG. 7 is a schematic structural diagram of an execution module according to an embodiment of the present specification.

In a feasible embodiment, as shown in FIG. 7, an execution module 15 includes an accelerator unit 151, a shift unit 152, a braking unit 153, and a steering unit 154.

The present disclosure further provides an embodiment of an intelligent cooperative control method for a connected vehicle fleet, as shown in FIG. 1, the method includes following contents.

S101: acquiring environment perception information and/or vehicle status information.

Optionally, in the step S101, the environment perception information specifically includes one or more of a longitudinal distance between a current vehicle and a preceding vehicle, a distance between a current vehicle and a lane sideline, and information about another road traffic participant in a vehicle fleet queue.

The vehicle status information includes one or more of a real-time vehicle speed, a real-time vehicle acceleration, and steering wheel angle information.

In this embodiment, as shown in FIG. 3, the information of the preceding vehicle, information about another road traffic participant, lane sideline information, and image information about an obstacle in a queue may be detected through the image sensing unit 111 within a preset range of the fleet queue; information about a distance from a preceding vehicle, information about another road traffic participants, and information about an obstacle in the queue may be acquired through a radio detection and ranging sensing unit 112 within a preset range of the vehicle fleet queue.

A longitudinal distance between a current vehicle and a preceding vehicle, a distance between a current vehicle and a lane sideline, and information about another road traffic participant in the vehicle fleet queue may be obtained through fusion calculation by a calculation unit 113. The preset range of the vehicle fleet queue can be adjusted according to their own requirements, and the obtained information is also not limited to the foregoing information, which is not listed herein.

As shown in FIG. 4, a real-time vehicle speed information may be acquired through a speed sensing unit 121; a real-time vehicle acceleration may be acquired through an inertia measurement sensing unit 122; a steering wheel angle information may be acquired through a steering angle sensing unit 123; the real-time vehicle speed, the real-time vehicle acceleration and the steering wheel angle information are converted into proper formats through a signal conversion unit 124; for example, electric signals, digital signals or image signals and the like. The above information may be converted into a required format according to own requirements.

In a feasible embodiment, after acquiring environment perception information and/or vehicle status information, the method further includes: transmitting, by an in-vehicle communications module 16, the environment perception information and the vehicle status information to a safety module 14, and transmitting the vehicle status information to a cooperative control module 13.

In this embodiment, the in-vehicle communications module 16 has the capability of implementing a functional safety ASIL-D level, and may verify the effectiveness of signal transmission; in a process of signal transmission, signal damage, delay, loss, repetition, sequential errors, information insertion, dummy information, or the like potentially occurs, and the in-vehicle communications module 16 may detect these problems effectively; when the in-vehicle communications module 16 fails, failure may also be detected, and a specific failure unit is identified, then an error is reported; and a corresponding safety state is entered through a corresponding safety mechanism.

ASIL represents an automotive safety level. This is a risk classification system that is defined by the ISO26262 standard for the functional safety of road vehicles. The standard defines the functional safety as "there is no unreasonable risk caused by the hazard associated with a fault behavior of an electrical electronic system.". ASIL establishes a safety requirement that meets the ISO26262 standard based on probability and tolerance of hazards to automotive components. ISO26262 determines four ASIL levels: ASIL-A, B, C, and D. ASIL-A represents a minimum level of vehicle hazard, and ASIL-D represents a maximal level of vehicle hazard. An airbag, an anti-lock braking system, and a power steering system must reach the ASIL-D level, which is a most stringent level applied to safety assurance because its failure takes a highest risk. The minimum safety level, such as a rear lamp, however, needs to reach the ASIL-A level. A headlight and a brake light typically need to reach the ASIL-B level, and cruise control typically needs to reach the ASIL-C level.

The ASIL level is established by performing hazard analysis and risk assessment. For each electronic component in a vehicle, it may be necessary to measure three specific variables: severity level (injury type to a driver and a passenger); exposure probability (whether a vehicle is frequently exposed to a hazard); controllability (an extent to which a driver is able to prevent an injury); each variable may be subdivided into several sub-classes. The severity level is divided into four levels, from "no harm" (S0) to "life-threatening/fatal injury" (S3). The exposure probability is divided into five levels, covering "highly impossible" (E0) to "highly possible" (E4). The controllability is divided into four levels, from "general controllable" (CO) to "uncontrollable" (C3). All variables and sub-classes need to be analyzed and combined to determine a desired ASIL. For example, a combination of a highest hazard (S3+E4+C3) results in reaching ASIL-D level.

Safety status include a complete safety state, a relative safety state (i.e., there's a need to avoid risk), an unsafe state, and the like, and the present application is not specifically limited thereto. An association relationship between signal data also can be understood as a corresponding relationship, for example, an acceleration function may correspond to an association relationship between a collision, a tire damage or a tire burst, vehicle status information, environmental perception information and a vehicle hazard to determine in what conditions the acceleration function corresponds a collision, or a tire damage, or a tire burst; an association relationship between the vehicle status information, the environment perception information and the risk level determines in what conditions the acceleration function corresponds to a low risk, or a medium risk or a high risk; and an association relationship between the vehicle hazard and the safety status determines in what conditions an impact corresponds to a complete safety state, or a relative safe state or an unsafe state, which are not specifically limited by the present application.

S102: calculating a vehicle safety control instruction based on the environment perception information and/or the vehicle status information.

Optionally, the step S102 specifically includes: fusing the environment perception information and the vehicle status information, and calculating the safety control instruction based on fused information.

In this embodiment, a safety module 14 receives the environment perception information and the vehicle status information from an in-vehicle communications module 16, and obtains the vehicle safety control instruction through calculation. As shown in FIG. 6, a perception fusion unit 141 receives the environment perception information and the vehicle status information transmitted by an in-vehicle communications module 16; and fuses the environment perception information and the vehicle status information, in order to make the environment perception information and the vehicle status information have a synergistic effect and complement each other, and the surrounding environment of the vehicle and the reachable space range are described; and transmits fused information to a planning decision unit 142. Based on the fused information, the vehicle safety control instruction is calculated through the planning decision unit 142; a data fusion algorithm including a Bayesian statistical theory, a neural network technology or a Kalman filtering method is mainly used to calculate the vehicle safety control instruction; and the vehicle safety control instruction specifically includes instructions such as accelerator acceleration or deceleration, upshift or downshift, braking or non-braking, left turn or stationary or right turn.

S103: acquiring a vehicle fleet cooperative control instruction sent by a vehicle.

Optionally, in the step S103, the vehicle fleet cooperative control instruction specifically includes a vehicle cruise speed and/or a cruise distance between vehicles in a vehicle fleet.

In this embodiment, in a vehicle fleet queue, a lead vehicle may send a vehicle fleet cooperative control instruction to complete the control of motion of vehicles in whole vehicle fleet, and a vehicle-to-vehicle communications module 17 may receive the vehicle fleet cooperative control instruction and transmit the vehicle fleet cooperative control instruction to a cooperative control module 13. The vehicle-to-vehicle communications module 17 also has the ability to achieve functional safety ASIL-D level, and can verify the effectiveness of signal transmission, including signal damage, delay, loss, repetition, sequential errors, information insertion and dummy information. When the vehicle-to-vehicle communications module 17 fails, a failure may be detected, a specific failure unit is identified and an error is reported, and a safety state is entered through a corresponding safety mechanism. The vehicle-to-vehicle communications module 17 has the ability to achieve functional safety ASIL-D level and when the vehicle-to-vehicle communications module 17 fails, a failure may be detected, a specific failure unit is identified and an error is reported, the function of entering a safe state through a corresponding safety mechanism is similar to the function of the aforementioned in-vehicle communications module 16, and details are not described herein.

S104: calculating a vehicle motion control instruction based on the vehicle fleet cooperative control instruction and/or the vehicle status information.

Optionally, in step S104, the vehicle motion control instruction specifically includes a longitudinal motion control instruction and/or a lateral motion control instruction.

The longitudinal motion control instruction includes accelerator acceleration, deceleration, upshift, downshift, braking and non-braking; and the lateral motion control instruction includes left turn, stationary, and right turn.

In this embodiment, as shown in FIG. 5, a cooperative control module 13 calculates a corresponding vehicle motion control instruction, and transmits the corresponding vehicle motion control instruction to a safety module 14 through an in-vehicle communications module 16 for comparison. The cooperative control module 13 receives a vehicle fleet cooperative control instruction which is transmitted by a vehicle-to-vehicle communications module 17; after receiving the vehicle fleet cooperative control instruction, a longitudinal motion control instruction is calculated through a longitudinal motion calculation unit 131 according to the received vehicle fleet cooperative control instruction and the obtained vehicle status information; and a lateral motion control instruction is calculated through a lateral motion calculation unit 132.

The vehicle fleet cooperative control instruction includes a vehicle cruise speed and/or a cruise distance between vehicles in a vehicle fleet; and the vehicle status information includes a real-time vehicle speed, a real-time vehicle acceleration, and steering wheel angle information and the like. The longitudinal motion control instruction includes accelerator acceleration/deceleration, upshift/downshift, braking/non-braking; and the lateral motion control instruction includes left turn, stationary, and right turn.

After a vehicle motion instruction is calculated, the vehicle motion control instruction is transmitted to the safety module 14 through the in-vehicle communications module 16.

S105: controlling the vehicle in response to the vehicle safety control instruction and the vehicle motion control instruction.

Optionally, the step S105 specifically includes: comparing the vehicle motion control instruction with the vehicle safety control instruction, and if the vehicle motion control instruction is consistent with the vehicle safety control instruction or a difference between the vehicle motion control instruction and the vehicle safety control instruction is within an allowable range, executing the vehicle motion control instruction;

if the vehicle motion control instruction is inconsistent with the vehicle safety control instruction or a difference between the vehicle motion control instruction and the vehicle safety control instruction exceeds an allowable range, executing the vehicle safety control instruction.

In this embodiment, as shown in FIG. 6, an arbitration unit 143 compares the vehicle safety control instruction calculated by a planning decision unit 142 with the received vehicle motion control instruction; and when a comparison result indicates that the vehicle motion control instruction meets a corresponding requirement, the safety module 14 transmits the vehicle motion control instruction to a corresponding execution module 15, that is, if the comparison result of the arbitration unit 143 indicates that the vehicle motion control instruction is consistent with the vehicle safety control instruction or the difference between the vehicle motion control instruction and the vehicle safety control instruction is within an allowable range, the vehicle motion control instruction is forwarded to the corresponding execution module 15 through the in-vehicle communications module 16, and the execution module 15 executes the received vehicle motion control instruction. The difference range may be set according to practical needs, and the aforementioned requirements to be met by the vehicle motion control instruction may also be set according to practical needs.

When the comparison result indicates that the vehicle motion control instruction does not meet the corresponding requirement, the safety module 14 transmits the vehicle safety control instruction to the corresponding execution module 15, that is, when the comparison result of the arbitration unit 143 indicates that the vehicle motion control instruction is inconsistent with the vehicle safety control instruction or the difference between the vehicle motion control instruction and the vehicle safety control instruction exceeds the allowable range, the vehicle safety control instruction is forwarded to the corresponding execution module 15 through the in-vehicle communications module 16, and the execution module 15 executes the received vehicle safety control instruction. The difference range can be set according to practical needs, and the requirements of the vehicle safety control instruction may also be set according to practical needs.

After the execution module 15 receives the vehicle motion control instruction or the vehicle safety control instruction, as shown in FIG. 7, an acceleration or deceleration action may be performed through an accelerator unit 151 in the execution module 15; an upshift or downshift action is performed through a shift unit 152; a braking or non-braking action is performed through a braking unit 153; and a left turn or stationary or right turn action is performed through a steering unit 154.

It can be seen from above, according to an intelligent cooperative control method and system for a connected vehicle fleet provided by an embodiment of the present disclosure, safety verification is performed on a cooperative control instruction, and if executing the cooperative control instruction poses a danger to vehicle or road traffic safety, a corresponding vehicle safety control instruction is executed by using the safety module to take over vehicle motion control, so that the occurrence of traffic accidents is avoided, and the stability of vehicle fleet and the safety of the system are improved.

It should be noted that method of the embodiments of the present disclosure may be executed through a single device, such as a computer or a server. The method in the embodiment may also be applied to a distributed scenario, and is completed by a plurality of devices cooperating with each other. In the case of such a distributed scenario, one of the plurality of devices may perform only one or more of steps in the method according to embodiments of the present disclosure, and the plurality of devices interact with each other to complete the method.

It should be noted that some embodiments of the present disclosure are described above. Other embodiments are within the scope of the appended claims. In some cases, actions or steps recited in claims may be performed in a different order than in the above-described embodiments and still achieve desired results. In addition, the processes depicted in the drawings do not necessarily require particular order or sequential order shown to achieve the desired results. In some embodiments, multi-task processing and parallel processing are also possible or may be advantageous.

Based on the same concept, corresponding to method according to any of embodiments above, the present disclosure further provides an electronic device, including a memory, a processor, and a computer program stored on the memory and executable on the processor, where the processor performs the intelligent cooperative control method for a connected vehicle fleet according to any one of the embodiments when executing the program.

Figure 8:
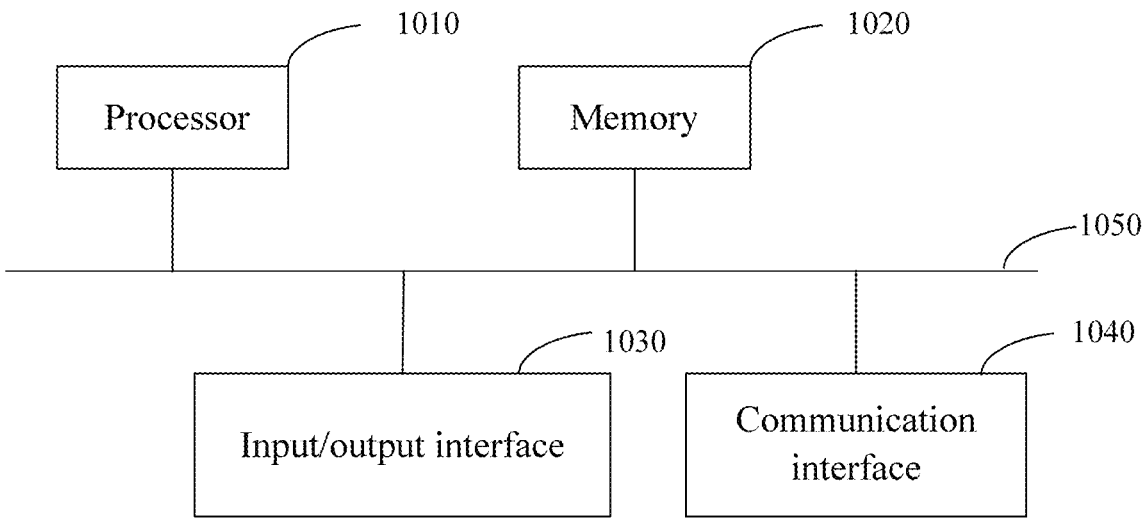
FIG. 8 is a schematic structural diagram of an electronic device according to an embodiment of the present specification.

FIG. 8 illustrates a more specific schematic structural diagram of an electronic device according to an embodiment of the present disclosure, and the device may include a processor 1010, a memory 1020, an input/output interface 1030, a communication interface 1040, and a bus 1050. The processor 1010, the memory 1020, the input/output interface 1030, and the communication interface 1040 implement a communication connection between each other inside the device through the bus 1050.

The processor 1010 may be implemented by using a general central processing unit (CPU), a microprocessor, an application specific integrated circuit (ASIC), or one or more of integrated circuits, and be configured to execute a related program to implement technical solution provided in the embodiments of the present specification.

The memory 1020 may be implemented in a form of a ROM (Read Only Memory), a RAM (Random Access Memory), a static storage device, a dynamic storage device, and the like. The memory 1020 may store an operating system and other applications, and when the technical solution provided in the embodiments of the present specification is implemented by using a software or a firmware, related program code is stored in the memory 1020, and is invoked and executed through the processor 1010.

The input/output interface 1030 is configured to connect to an input/output module to implement information input and output. The input/output module may be configured as a component in a device (not shown in drawing), or may be externally connected to a device to provide a corresponding function. An input device includes a keyboard, a mouse, a touch screen, a microphone, various sensors, and the like, and an output device includes a display, a speaker, a vibrator, an indicator light, and the like.

The communication interface 1040 is configured to connect to a communication module (not shown in drawing), so as to implement a communication interaction between present device and other devices. The communication module may implement communication in a wired manner (such as a USB, a network cable, and the like), or in a wireless manner (such as a mobile network, WiFi, Bluetooth, and the like).

The bus 1050 includes a path that transmits information between various components of the device (such as the processor 1010, the memory 1020, the input/output interface 1030, and the communication interface 1040.

It should be noted that although the device only shows the processor 1010, the memory 1020, the input/output interface 1030, the communication interface 1040, and the bus 1050, however, in a specific implementation process, the device may further include other components necessary to implement normal operation. In addition, people skilled in the art shall be understand that the foregoing devices may only include components necessary to implement the solutions of the embodiment of the present specification, and do not necessarily include all the components shown in drawings.

The electronic device in the foregoing embodiment is configured to implement the corresponding intelligent cooperative control method for a connected vehicle fleet in any one of the foregoing embodiments, and has the beneficial effects of corresponding method embodiments, and details are not described herein again.

Based on the same concept, corresponding to the method described above, the present disclosure further provides a non-transitory computer-readable storage medium, wherein the non-transitory computer-readable storage medium stores computer instructions, and wherein the computer instructions cause the computer to execute the intelligent cooperative control method for a connected vehicle fleet according to any one of above embodiments.

Computer-readable medium of the embodiment includes permanent and non-permanent, removable and non-removable medium, and information storage may be implemented by any method or technique. The information may be a computer-readable instruction, a data structure, a program module, or other data. Examples of a computer storage medium include, but are not limited to, phase change memory (PRAM), static random access memory (SRAM), dynamic random access memory (DRAM), other types of random access memory (RAM), read-only memory (ROM), electrically erasable programmable read-only memory (EE-PROM), flash memory or other optical storage, magnetic cassette tape, magnetic tape magnetic disk storage or other magnetic storage devices, or any other non-transmission medium, and may be used to store information that can be accessed by a computing device.

The computer instructions stored in the storage medium of above embodiments cause the computer to execute the intelligent cooperative control method for a connected vehicle fleet according to any one of the above embodiments, and have the beneficial effects of corresponding method embodiments, and details are not described herein again.

It should be understand by people of ordinary skill in the art that, the discussion of any of the above embodiments is merely exemplary, and is not intended to imply that the scope (including the claims) of the present disclosure is limited to these examples; in the solution of the present disclosure, the technical features in the above embodiments or different embodiments also be combined, the steps may be implemented in any order, and there are many other changes in different aspects of the embodiments of the present disclosure as described above, and for brevity, they are not provided in detail.

In addition, to simplify the description and discussion, and in order not to make embodiments of the present disclosure difficult to understand, well-known power/ground connections with integrated circuit (IC) chips and other components may be shown or not be shown in the accompanying drawings provided. Furthermore, the apparatus may be shown in a block diagram form in order to avoid obscuring the embodiments of the present disclosure, and this also takes into account the fact that the details regarding the embodiments of these block diagrams apparatus are highly dependent on a platform to implement the embodiments of the present disclosure (that is, these details should be fully within the understanding scope of people skilled in the art). Where specific details (for example, circuits) are set forth to describe exemplary embodiments of the present disclosure, it will be apparent to people skilled in the art that embodiments of the present disclosure may be practiced without these specific details or with changes in these specific details. Therefore, these descriptions should be considered as illustrative and not restrictive.

Although the present disclosure has been described in connection with specific embodiments of the present disclosure, many alternatives, modifications and variations of these embodiments will be apparent to those of ordinary skill in the art from the foregoing description. For example, other memory architectures (for example, dynamic RAM (DRAM)) may use the embodiments discussed.

The foregoing descriptions are merely specific embodiments of the present specification, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. An intelligent cooperative control method for a coupled vehicle fleet, comprising:
    acquiring environment perception information and vehicle status information, wherein the environment perception information indicates both a distance between a current vehicle and a lane sideline and a longitudinal distance between the current vehicle and a preceding vehicle;

fusing the environment perception information which indicates the distance between the current vehicle and the lane sideline and the longitudinal distance between the current vehicle and a preceding vehicle with the vehicle status information;

calculating a vehicle safety control instruction based on the environment perception information fused with the vehicle status information;

acquiring a vehicle fleet cooperative control instruction sent by a vehicle;

calculating a vehicle motion control instruction based on the vehicle fleet cooperative control instruction and the vehicle status information;

comparing the vehicle motion control instruction with the vehicle safety control instruction;

controlling the vehicle according to the vehicle motion control instruction in response to the vehicle motion control instruction being consistent with the vehicle safety control instruction or a difference between the vehicle motion control instruction and the vehicle safety control instruction being within an allowable range; and controlling the vehicle according to the vehicle safety control instruction in response to the vehicle motion control instruction being inconsistent with the vehicle safety control instruction or a difference between the vehicle motion control instruction and the vehicle safety control instruction exceeding the allowable range.

2. The intelligent cooperative control method according to claim 1, wherein the environment perception information further comprises information about another road traffic participant in a vehicle fleet queue; and wherein the vehicle status information comprises one or more of a real-time vehicle speed, a real-time vehicle acceleration, and steering wheel angle information.

3. The intelligent cooperative control method according to claim 1, wherein the vehicle fleet cooperative control instruction comprises a vehicle cruise speed and/or a cruise distance between vehicles in a vehicle fleet.

4. The intelligent cooperative control method according to claim 1, wherein the vehicle motion control instruction comprises a longitudinal motion control instruction and/or a lateral motion control instruction; and wherein the longitudinal motion control instruction comprises at least one of acceleration, deceleration, upshift, downshift, braking and non-braking; and the lateral motion control instruction comprises at least one of left turn, stationary, and right turn.

5. The intelligent cooperative control method for a coupled vehicle fleet according to claim 1, wherein controlling the vehicle comprises executing instructions that comprise at least one of acceleration, deceleration, upshift, downshift, braking, non-braking, left turn, stationary, and right turn.

6. An electronic device, comprising: a memory, a processor, and a computer program stored on the memory and executable on the processor, wherein when executing the computer program the processor performs a method for controlling a coupled vehicle fleet, the method comprising:

acquiring environment perception information and vehicle status information, wherein the environment perception information indicates both a distance between a current vehicle and a lane sideline and a longitudinal distance between the current vehicle and a preceding vehicle;

fusing the environment perception information which indicates the distance between the current vehicle and the lane sideline and the longitudinal distance between the current vehicle and a preceding vehicle with the vehicle status information;

calculating a vehicle safety control instruction based on the environment perception information fused with the vehicle status information;

acquiring a vehicle fleet cooperative control instruction sent by a vehicle;

calculating a vehicle motion control instruction based on the vehicle fleet cooperative control instruction and the vehicle status information;

comparing the vehicle motion control instruction with the vehicle safety control instruction;

controlling the vehicle according to the vehicle motion control instruction in response to the vehicle motion control instruction being consistent with the vehicle safety control instruction or a difference between the vehicle motion control instruction and the vehicle safety control instruction being within an allowable range; and controlling the vehicle according to the vehicle safety control instruction in response to the vehicle motion control instruction being inconsistent with the vehicle safety control instruction or a difference between the vehicle motion control instruction and the vehicle safety control instruction exceeding the allowable range.

7. The electronic device of claim 6, wherein the environment perception information further comprises information about another road traffic participant in a vehicle fleet queue; and wherein the vehicle status information comprises one or more of a real-time vehicle speed, a real-time vehicle acceleration, and steering wheel angle information.

8. The electronic device of claim 6, wherein the vehicle fleet cooperative control instruction comprises a vehicle cruise speed and/or a cruise distance between vehicles in the vehicle fleet.

9. The electronic device of claim 6, wherein the vehicle motion control instruction comprises a longitudinal motion control instruction and/or a lateral motion control instruction; and wherein the longitudinal motion control instruction comprises at least one of acceleration, deceleration, upshift, downshift, braking and non-braking; and the lateral motion control instruction comprises at least one of left turn, stationary, and right turn.

10. A non-transitory computer-readable storage medium, wherein the non-transitory computer-readable storage medium stores computer instructions configured to make a computer perform an intelligent cooperative control method for a coupled vehicle fleet, the method comprising:

acquiring environment perception information and/or vehicle status information, wherein the environment perception information indicates both a distance between a current vehicle and a lane sideline and a longitudinal distance between the current vehicle and a preceding vehicle;

fusing the environment perception information which indicates the distance between the current vehicle and the lane sideline and the longitudinal distance between the current vehicle and a preceding vehicle with the vehicle status information;

calculating a vehicle safety control instruction based on the environment perception information fused with the vehicle status information;

acquiring a vehicle fleet cooperative control instruction sent by a vehicle;

calculating a vehicle motion control instruction based on the vehicle fleet cooperative control instruction and the vehicle status information;

comparing the vehicle motion control instruction with the vehicle safety control instruction;

controlling the vehicle according to the vehicle motion control instruction in response to the vehicle motion control instruction being consistent with the vehicle safety control instruction or a difference between the vehicle motion control instruction and the vehicle safety control instruction being within an allowable range; and controlling the vehicle according to the vehicle safety control instruction in response to the vehicle motion control instruction being inconsistent with the vehicle safety control instruction or a difference between the vehicle motion control instruction and the vehicle safety control instruction exceeding the allowable range.

11. The non-transitory computer-readable storage medium of claim 10, wherein the environment perception information further comprises information about another road traffic participant in a vehicle fleet queue; and wherein the vehicle status information comprises one or more of a real-time vehicle speed, a real-time vehicle acceleration, and steering wheel angle information.

12. The non-transitory computer-readable storage medium of claim 10, wherein the vehicle fleet cooperative control instruction comprises a vehicle cruise speed and/or a cruise distance between vehicles in a vehicle fleet.

13. The non-transitory computer-readable storage medium of claim 10, wherein the vehicle motion control instruction comprises a longitudinal motion control instruction and/or a lateral motion control instruction; and wherein the longitudinal motion control instruction comprises at least one of acceleration, deceleration, upshift, downshift, braking and non-braking; and the lateral motion control instruction comprises at least one of left turn, stationary, and right turn.

14. The non-transitory computer-readable storage medium of claim 10, wherein controlling the vehicle comprises executing instructions that comprise at least one of acceleration, deceleration, upshift, downshift, braking, non-braking, left turn, stationary and right turn.

* * * * *